United States Patent [19]

Wong

[11] Patent Number: 5,301,220

[45] Date of Patent: Apr. 5, 1994

[54] MULTI-MODE ACQUISITION X-RAY IMAGING METHOD AND APPARATUS

[75] Inventor: Hung Y. Wong, Solon, Ohio

[73] Assignee: Picker International, Inc., Highland Hts., Ohio

[21] Appl. No.: 940,180

[22] Filed: Sep. 3, 1992

[51] Int. Cl.$^5$ .............................................. H05G 1/64
[52] U.S. Cl. ...................................... 348/162; 348/77
[58] Field of Search ........................... 378/99; 358/111

[56] References Cited

U.S. PATENT DOCUMENTS

| | | | |
|---|---|---|---|
| 4,802,002 | 1/1989 | Plut et al. | 378/99 |
| 4,896,211 | 1/1990 | Hunt et al. | 358/106 |
| 4,922,337 | 5/1990 | Hunt et al. | 358/101 |
| 4,949,172 | 8/1990 | Hunt et al. | 358/101 |
| 5,040,057 | 8/1991 | Gilblom et al. | 358/101 |
| 5,087,986 | 2/1992 | Hunt et al. | 359/629 |
| 5,101,272 | 3/1992 | Plut et al. | 358/137 |

*Primary Examiner*—Craig E. Church
*Attorney, Agent, or Firm*—Fay, Sharpe, Beall, Fagan, Minnich & McKee

[57] ABSTRACT

A multi-mode acquisition x-ray imaging system (A) provides a unified apparatus and method to acquire valid x-ray video images including the last image of a run, and to display these images flicker-free on an image monitor (50). A beam blanking signal (54) synchronizes operation of a TV camera (48) and TV camera controller (56), so all image data or frames acquired in any acquisition mode including one having a pulse exposure rate or an asynchronous pulse exposure rate is acquired and processed by a digital imaging system (40). The image data is stored in a dual buffered storage (76) which alternatingly connects a first buffer (80a) and a second buffer (80b) to the image monitor (50). When the exposure rate is changed, transition logic (84) determines whether images, exposed during the transition to another exposure rate are under or overexposed.

23 Claims, 14 Drawing Sheets

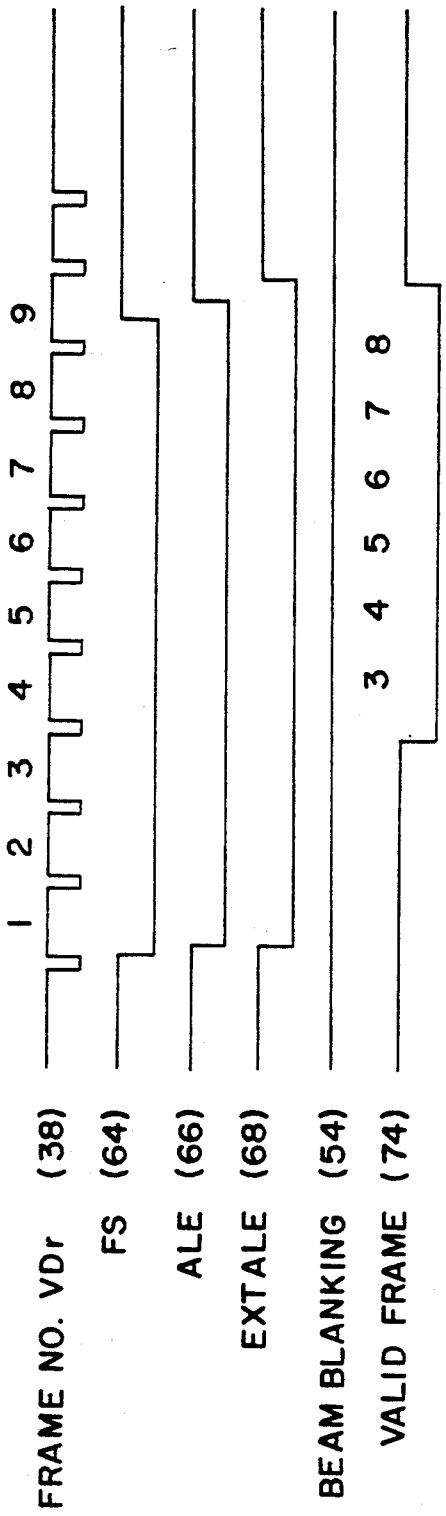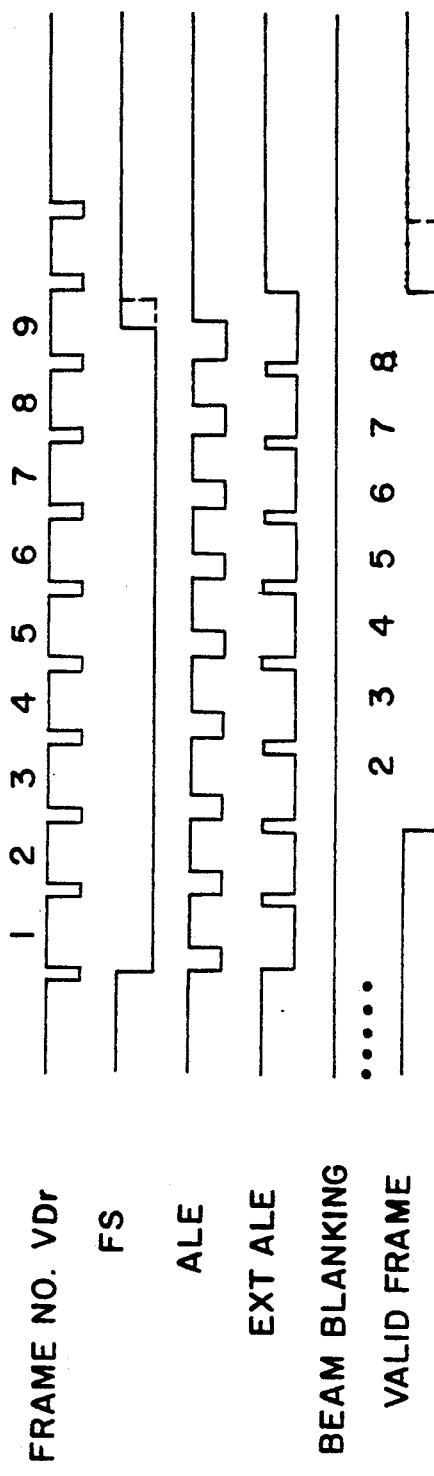

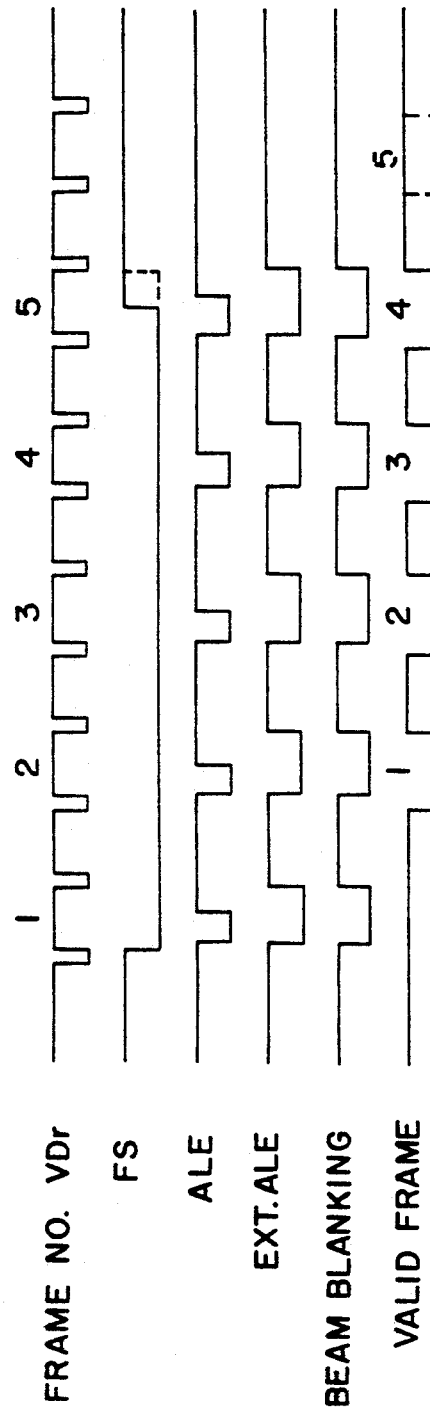
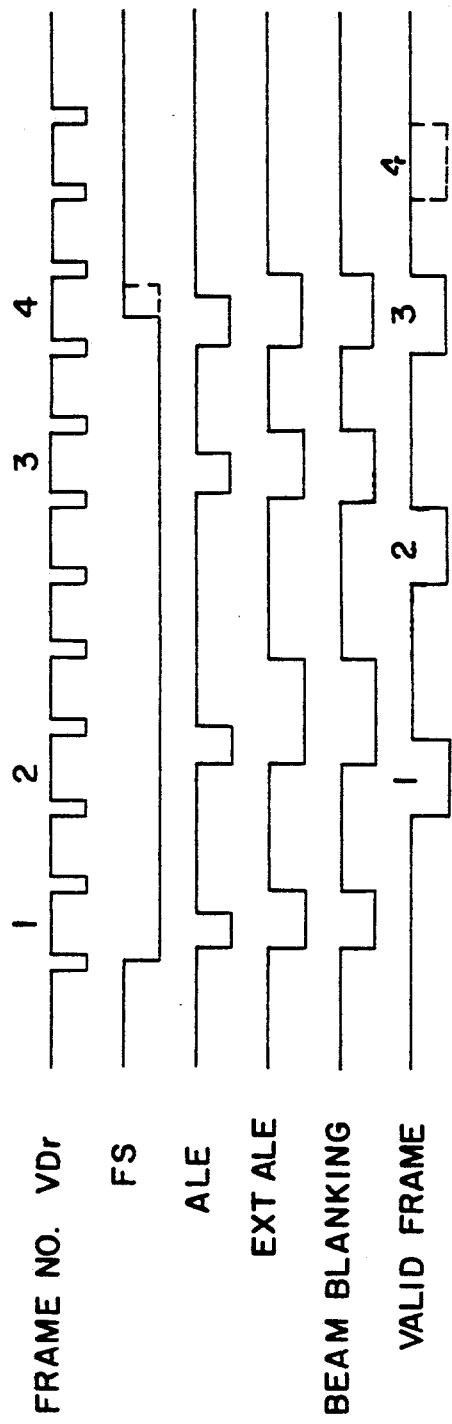
FIG. 4C
FIG. 4D

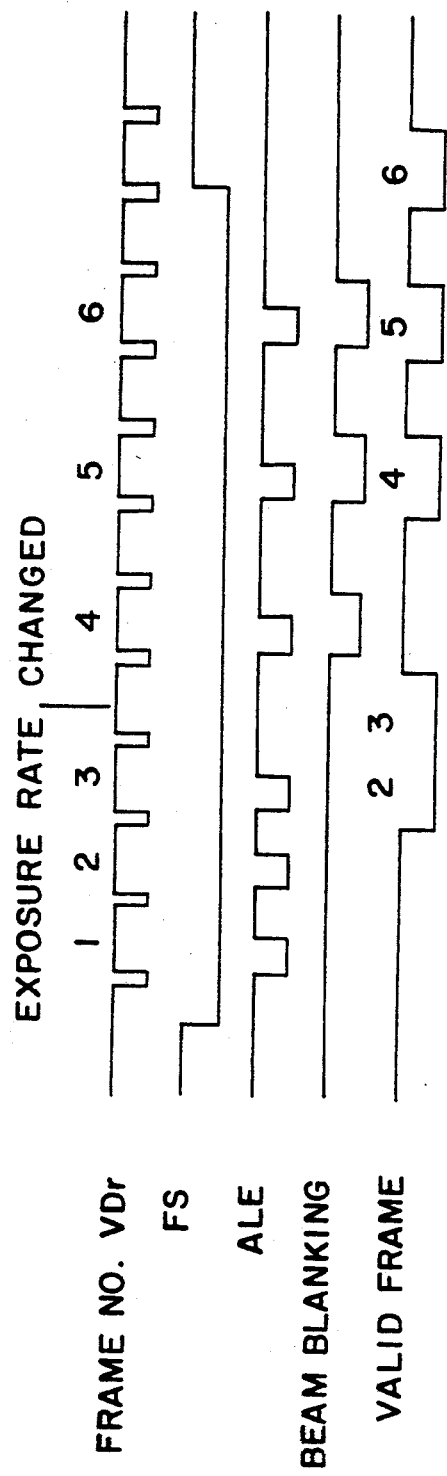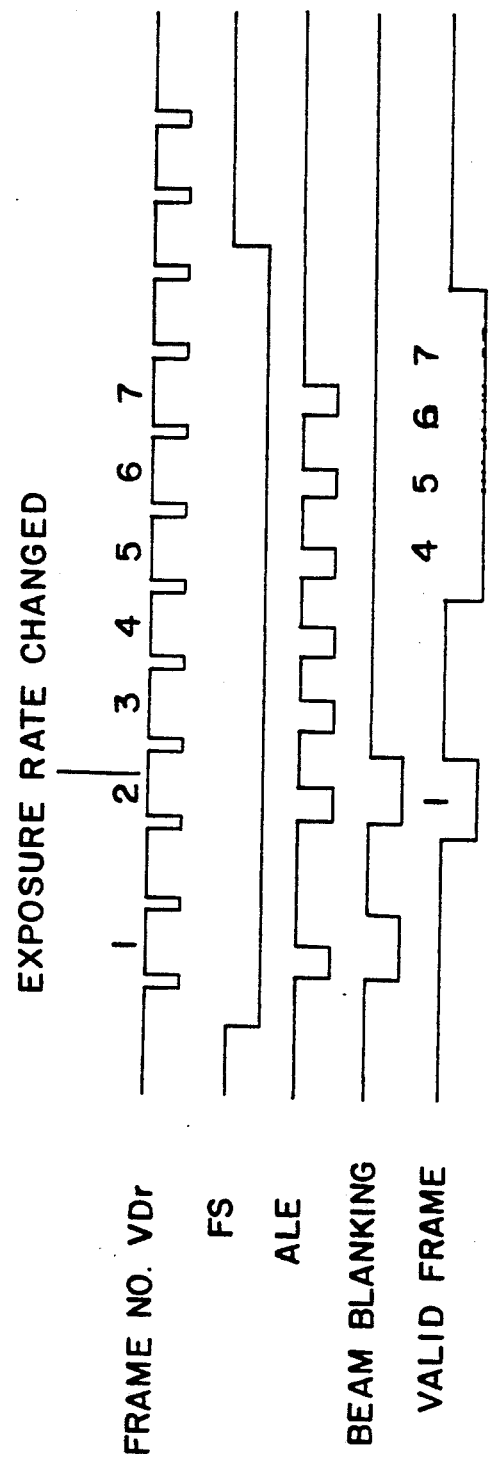

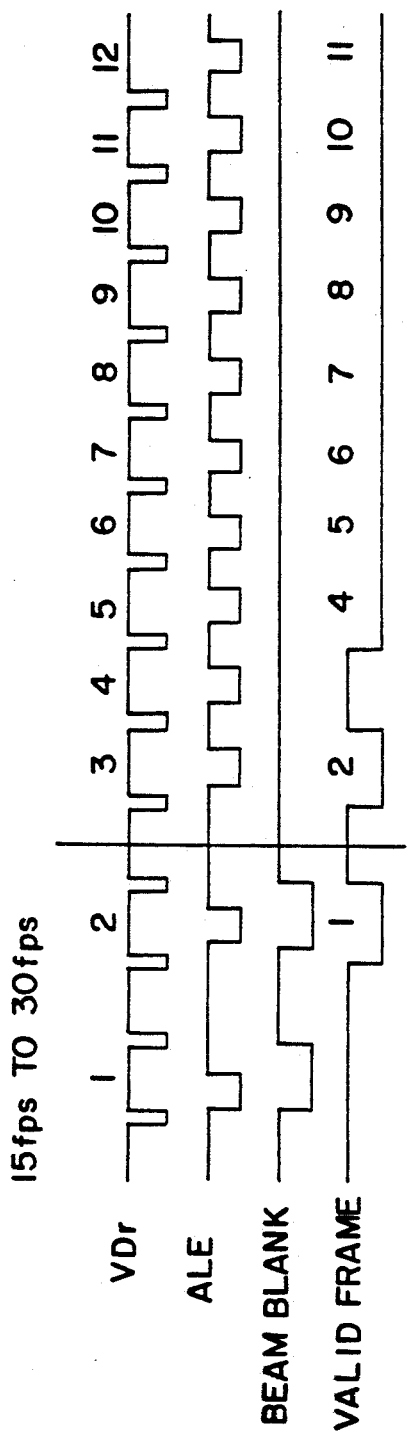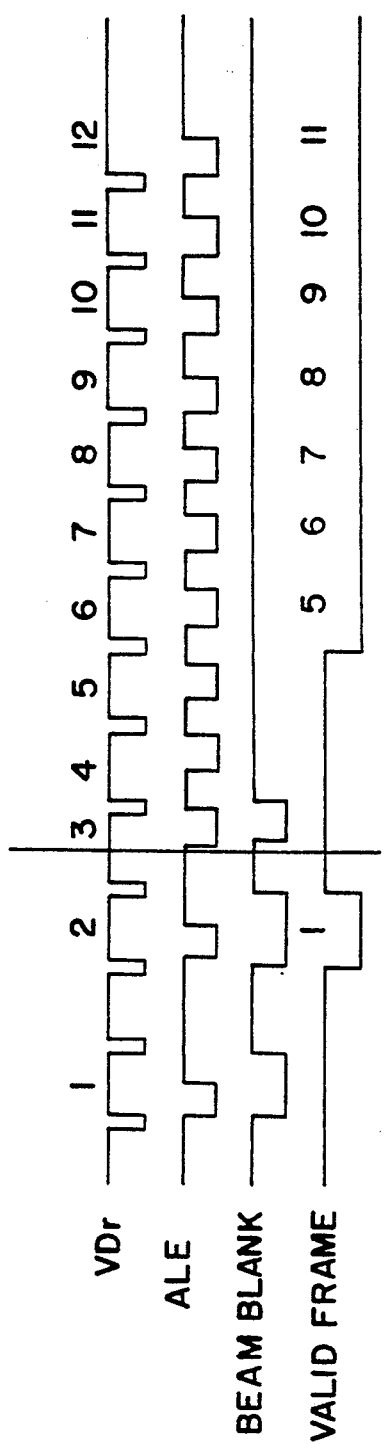
FIG. 7A
FIG. 7B

MULTI-MODE ACQUISITION X-RAY IMAGING METHOD AND APPARATUS

BACKGROUND OF THE INVENTION

The present invention relates to the image processing arts. It finds particular application in conjunction with controlling the acquisition of diagnostic images acquired in a plurality of modes and will be described with particular reference thereto. However, it is to be appreciated that the invention is also applicable to other fields where images are acquired with multiple clock rates.

Conventionally, multi-mode imaging systems could process digitally only images acquired in a mode synchronous with that of a system reference signal. Image data acquired in acquisition modes asynchronous to the reference signal were directly displayed without the benefit of digital processing. In conventional imaging systems, when an operator changes the x-ray exposure for image acquisition, the system continues to acquire and/or display all images during the period of transition from the original rate to the new rate, whether the images are properly exposed or not. When the end of an imaging run is completed by the deactivation of a foot switch or a hand switch, the frame being acquired when deactivation occurs is always discarded to avoid the possibility of displaying an underexposed image.

In conventional multi-mode acquisition x-ray systems, data acquired during an asynchronous acquisition mode is sent from the acquiring camera directly to a display, without digital image processing. The asynchronously acquired image data causes flickering on the monitor in a degree according to the operating exposure rate. Additionally, due to this direct passing of the image data, when image acquisition operations cease, the display will become blank, not holding the last image. Further, since the conventional x-ray imaging system continues to display and/or acquire all images during the transition from one exposure rate to another, a disruption in the flow of valid images on the display takes place. The improperly exposed images acquired during the transition are displayed. Also, since the last image in a run is automatically discarded without checking its validity, there is a likelihood that valid images containing valuable information are discarded.

In accordance with the present invention, a unified apparatus and method are provided to acquire good x-ray video images regardless of the acquisition mode and exposure rate.

SUMMARY OF THE INVENTION

In accordance with one aspect of the present invention, a multi-mode x-ray imaging system is provided for maximizing the valid x-ray video images displayed on an image monitor and/or stored in an image storage device. In the system, x-rays are projected across an examination region and converted to light images. Light images developed from the projected x-rays are integrated by a video camera device. A reference signal from a digital imaging system is generated. Acquisition modes and x-ray exposure rates selected by an operator and inputted through an interface controller are monitored by the digital imaging system. When it is determined that an acquisition mode has a pulse exposure rate or an asynchronous pulse exposure rate, a beam blanking signal synchronous to the reference signal is generated by the digital imaging system and is transmitted to the video camera device. The beam blanking signal causes the video camera device to store the image data developed from the projected x-rays. When generation of the beam blanking signal has ended, the stored image data is read out. The read out image data is digitized and written into a first buffer of a dual buffered acquisition storage. At generation of the reference signal, the image data in the first buffer is checked to see if it is a valid image. When the image data is found to be valid, an output of the dual buffered acquisition storage is digitally processed and connected to an image monitor to display the image data. The next digitized image from the video camera is written into a second buffer of the dual buffered acquisition storage while the valid image in the first buffer of the dual buffered acquisition storage is displayed.

In accordance with another aspect of the present invention, a method of validating a last image acquired during operation of an x-ray system is provided. An operation switch controlled by an operator controls the projection of x-rays across an examination region. The time is monitored within a cycle of a reference signal when the projection of x-rays ends. It is determined whether the x-ray exposure was completed prior to the monitored time in the reference signal cycle. A valid frame signal is generated when the x-ray exposure is completed prior to the deactivation.

In accordance with yet another aspect of the present invention, a method is provided for displaying only valid images on a display when an x-ray exposure rate is changed from an initial x-ray exposure rate during operation of a multi-mode x-ray system. An operator selects a new x-ray exposure rate different from the initial x-ray exposure rate. Transition logic determines whether last image data being acquired prior to selecting of the new x-ray exposure rate is completed before a new x-ray exposure at the new x-ray exposure rate occurs. An indication signal is generated by the transition logic and transmitted to a valid frame signal generator to indicate the last image data is invalid, when it is determined that the last image data is still being acquired by the video camera when the transition new exposure commences and that the last image data is valid, when it is determined that the video camera has acquired the last image data prior to the new x-ray exposure.

In accordance with a more limited aspect of the present invention, the above-referenced switching between the first buffer and second buffer in the dual buffered acquisition storage occurs only when the buffer not currently displaying its image data is determined to contain a valid image.

In accordance with another more limited aspect of the present invention, when cessation of the projection of x-rays across the examination region occurs, the last valid image displayed on the image monitor continues to be displayed.

One advantage of the present invention resides in provision of a unified apparatus and method to acquire good x-ray video images and to display the images flicker-free, regardless of the acquisition modes and exposure rates.

Another advantage of the present invention resides in maintaining a display of the last valid image after x-ray exposure stops.

Still another advantage of the present invention resides in the provision of transition logic which permits the exposure rate to be changed on-the-fly without displaying an improperly exposed image. The display flows from one exposure rate to another without disruptions, such as flickering images, appearing on the display or image monitor.

Yet another advantage of the present invention is that the last image of a run is checked to determine its validity and if valid, it is retained.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 4A is a timing diagram for a continuous exposure mode;

FIG. 4B is a timing diagram of a continuous pulse exposure mode;

FIG. 4C is a timing diagram of a pulse exposure mode;

FIG. 4D is a timing diagram of an asynchronous pulse exposure mode;

FIG. 5A is a timing diagram showing a transition from a continuous pulse exposure mode to a pulse exposure mode;

FIG. 5B is a timing diagram for a transition from a pulse exposure mode to a continuous pulse exposure mode; and, FIGS. 6A–12B are timing diagrams for a plurality of differing exposure rates.

DETAILED DESCRIPTION OF THE PREFERRED EMBODIMENTS

Figure 1A:
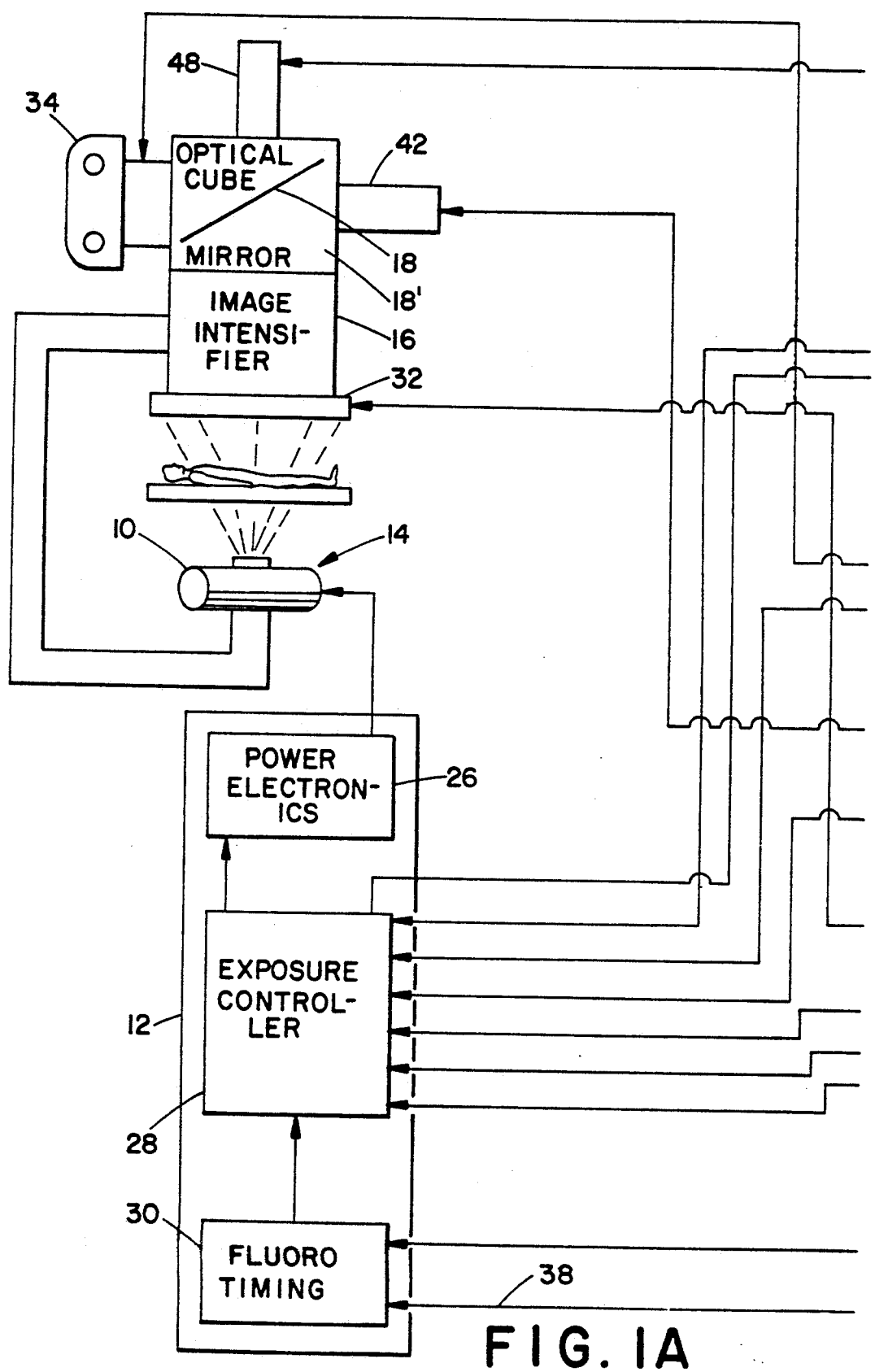
FIGS. 1A and 1B taken together are a diagrammatic illustration of a multi-mode x-ray imaging system in accordance with the present invention.
Figure 1B:
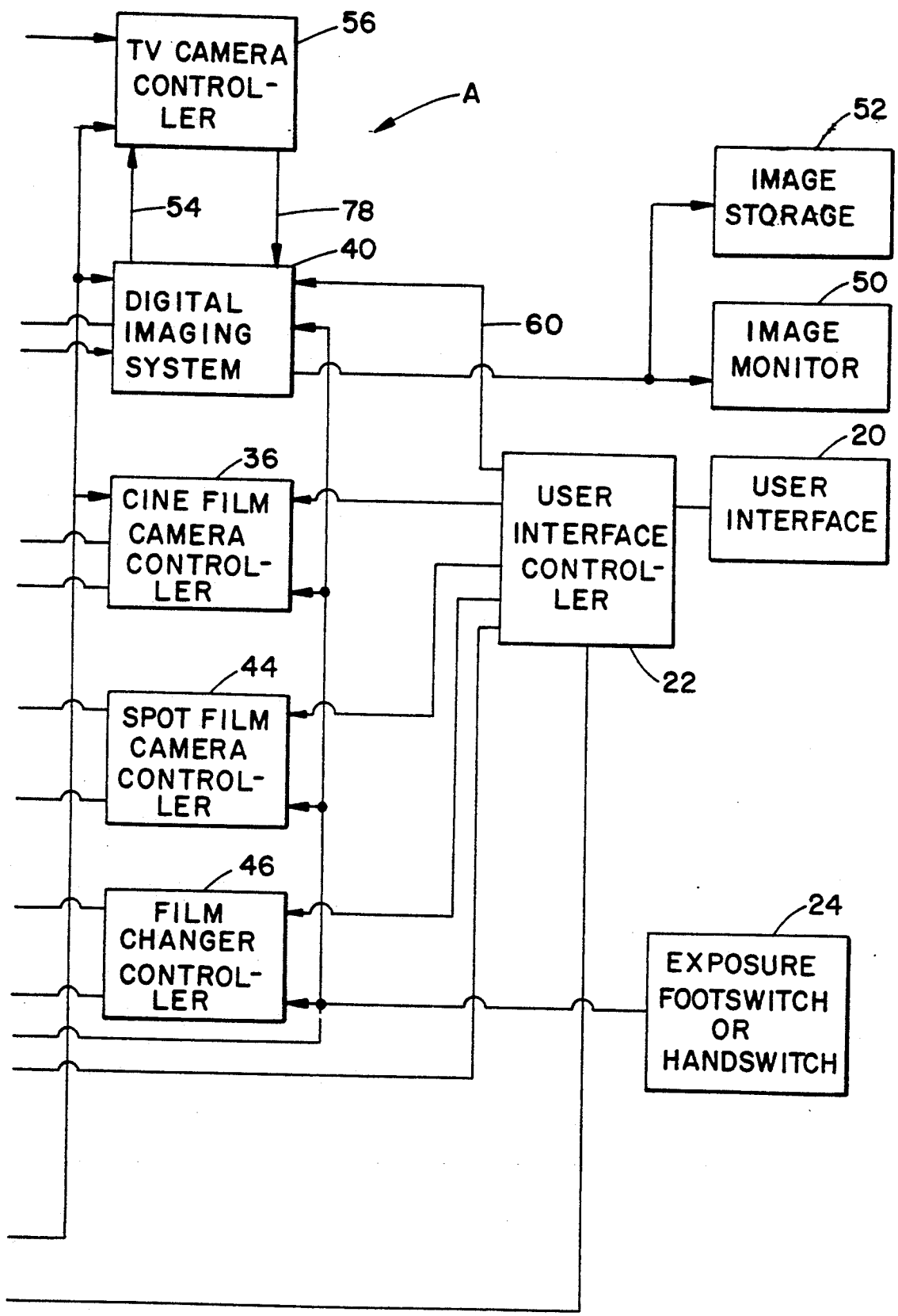

With reference to FIGS. 1A and 1B, a multi-mode x-ray imaging system A includes an x-ray tube 10 controlled by x-ray generator 12 to pass x-rays through a patient placed in an examination region 14. The x-ray which has passed through the examination region is converted to light and amplified by an image intensifier 16. More specifically, the difference in x-ray attenuation along each path through the examination region is converted by phosphors of the image intensifier to a shadowgraphic optical image of the x-ray transmissiveness of a subject in the examination region. The amplified optical image is selectively sent to different camera heads by a partially silvered mirror 18 located within an optical cube or image splitter 18′. The partially silvered mirror 18 allows part of the light to pass through and is movable to reflect the other part of the light to a selectable one of a plurality of peripheral viewing ports. Such an arrangement makes it possible for at least two different camera heads to view the optical image simultaneously.

A user interface 20 enables an operator to select various system controls and events which are input to the system through user interface controller 22. An operator further controls the functioning of the system through the use of an operation switch in the form of an exposure foot switch or hand switch 24.

The x-ray generator 12 includes power electronics 26, an exposure controller 28, and a fluoro timing control 30. The x-ray generator 12 receives the signals from the system to control the power provided to the x-ray tube 10 according to a selected acquisition mode. More specifically, the x-ray generator controls the tube current or mA, the tube voltage or kV, and the exposure time. By adjusting these components of x-ray tube power, images with various properties, such as contrast, are selectable. In a flouroscopic mode, the x-ray generator causes the x-ray tube to emit x-rays at a lower power continuously or pulsing. The lower power x-rays cause a corresponding low intensity optic on the image intensifier. In other modes, the x-ray generator causes the x-ray tube to emit higher power x-rays for a short duration, i.e., an x-ray pulse. Each x-ray pulse causes a higher intensity optical image on the image intensifier. In some modes, a series of optical images are generated by causing the x-ray tube to emit a corresponding series of pulses of the higher power x-rays.

Figure 3:
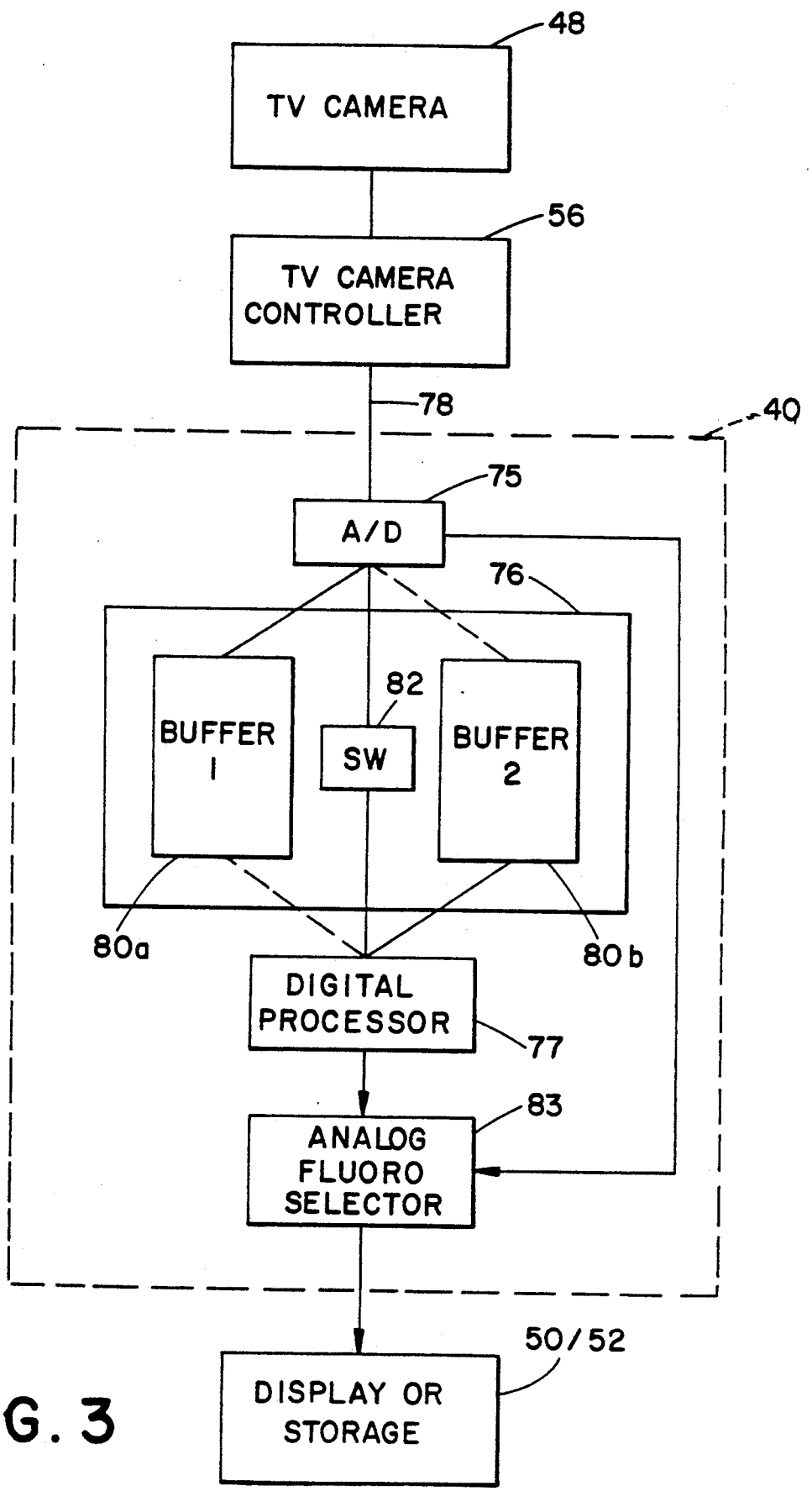
FIG. 3 is a block diagram illustrating the dual buffered acquisition storage within the digital imaging system.

In the present system, various acquisition modes are controlled and the resultant electronic images processed by a digital imaging system 40. With reference to FIG. 3, the digital imaging system 40 includes an A/D converter 75, digital processor 77, an analog fluoro selector 83, a dual buffered acquisition storage means 76 including a first buffer 80a, a second buffer 80b, and a switching device 82. Generally, and as will be described in greater detail below, digitized camera video signals are transmitted to the dual buffered acquisition storage means 76. While image data is being transmitted to the first buffer 80a, a prior valid image stored in the second buffer 80b is displayed on an image monitor 50 or stored in image storage memory 52. When it is determined that a valid image has been stored in the first buffer 80a, the switch 82 causes the valid image frame in the first buffer 80a to be displayed or stored and causes the second buffer 80b to receive subsequent image frames. The switch 82 maintains this state until it is determined by the system that a valid image frame has been acquired in the second buffer. The switch then changes state reversing the roles of the two buffers. If no valid image frame is detected, the switch does not change states. By this arrangement, the most recent valid image frame continues to be displayed on the image monitor 50 until the next valid image frame is acquired.

In the preferred embodiment, ten different acquisition modes are provided, namely, (i) cine film, (ii) spot film, (iii) film changer, (iv) digital cine, (v) digital spot, (vi) cine verification, (vii) spot verification, (viii) changer verification, (ix) analog fluoro, and (x) digital fluoro.

In the cine film mode, a film changer 32, shown in FIG. 1A in a forward position, is moved out of the x-ray path. The split mirror 18 is moved to a position to reflect the light image to a cine camera 34. The only acquisition medium used in this mode is 35 mm cine photographic film. There is no digital acquisition by the cine camera. The exposure of the patient to the x-rays produced by the x-ray generator 12 is controlled in accordance with a cine film camera controller 36. Typically, the cine camera can be set to expose its film at 30, 60, 90, or 120 frames per second. More specifically, the cine film camera controller controls the x-ray generator 12 to generate a x-ray pulse 30, 60, 90, or 120 times per second in accordance with the selected cine camera speed. Each pulse is selected such that the product of the mA and kV is appropriate to produce an optical image on the screen of the intensifier 16 in 1/30th of a second or less in the 30 fps mode, 1/60th of a second or less in the 60 fps mode, etc. The cine controller controls the gating of the x-rays and the shutter of the cine camera to be synchronized with a reference clock signal (VDr) 38 that is generated by the digital imaging system 40.

In the spot film mode, the film changer 32 is moved out of the x-ray beam and the split mirror 18 is positioned as shown in FIG. 1A to direct the optical image to a spot film camera 42. The spot camera exposes 100 or 105 mm photograph film. The spot film camera and the x-ray generator exposure controller are coordinately controlled by a spot film camera controller 44. The exposure rate timing is generated internally and is not synchronized to VDr 38. Generally, selectable exposure rates for a spot film camera are single frame, 1 frame per sec, 2/s, 3/s, 4/s, and 6/s. The exposure control causes x-ray pulses at the same rate, each of the appropriate power to generate an optical image on the image intensifier that exposes one frame of the photographic film.

In the film changer mode, the film changer 32 is positioned as shown in FIG. 1A and the split mirror 18 position is not relevant because the film changer 32 is the only acquisition means selected. There is no digital acquisition by the film changer. Generally, selectable exposure rates for this mode are single frame, 1/s, 2/s, 3/s, and 4/s. The exposure controller 28 is controlled by a film changer controller 46 to generate x-ray pulses at the rate as the selected rate of the photographic film. The exposure rate timing is generated internally and is not synchronized to VDr 38.

In the digital cine mode, the film changer 32 is moved out of the x-ray beam. The split mirror 18 is placed so that all the light is directed to a TV camera 48. The image is acquired digitally through the TV camera 48 and is displayed on the image monitor display 50 and/or stored in the image storage device 52. The x-ray generator exposure is controlled by the digital imaging system 40 to generate x-ray pulses in coordination with the frame acquisition rate of the video camera 48. The exposure rate timing is synchronized to VDr 38. Generally selectable rates are 15, 30, and 60 fps.

In the digital spot mode, the film changer 32 is moved out of the x-ray beam examination region 14. The split mirror 18 is placed so that the optical image is viewed only by a TV camera 48. The image is acquired digitally through the TV camera 48 and is displayed on the image monitor display 50 and/or stored in the image storage device 52. The x-ray generator exposure is again controlled by the digital imaging system 40 in accordance with the selected frame acquisition rate of the video camera. The exposure rate timing is synchronized to VDr 38. Selectable exposure rates are typically single frame, 1/s, 2/s, 3/s, 4/s, and 7.5/s.

In the cine verification mode, the film changer 32 is moved out of the x-ray beam. The split mirror 18 is moved to the position to split the optical image between the cine camera 34 and the TV camera 48. Typically, the split mirror 18 also allows 10-20% of light to pass through to the TV camera 48. The optical image is then viewed simultaneously by the cine film camera 34 and the TV camera 48. The exposure controller 28 and the cine camera are controlled by the cine film camera controller 36 at a timing rate that is synchronized with the VDr clocking signal 38. Because the VDr clocking signal is synchronized with the video camera frame acquisition rate, the x-ray pulses are generated at a rate that is synchronized to both the cine camera and the video camera. Generally, selectable exposure rates are the exposure rates for the cine camera, i.e., 30, 60, 90, and 120 fps.

In the spot verification mode, the film changer 32 is moved out of the x-ray beam and the split mirror 18 is positioned as shown in FIG. 1A. In this position, the split mirror 18 reflects 80-90% of the light to the spot film camera 42 and allows 10-20% of light pass through to the TV camera 48. The optical image is viewed simultaneously by the spot film camera 42 and by the TV camera 48. The exposure controller is controlled by the spot film camera controller 44 and the exposure rate timing is not synchronized with reference timing signal VDr 38. Generally, selectable exposure rates are the spot camera rates, i.e., single frame, 1/s, 2/s, 3/s, 4/s, and 6/s.

In the changer verification mode, the film changer 32 is positioned as shown in FIG. 1A which limits the amount of x-rays passing through to the image intensifier. The split mirror 18 is placed to the side of the optical cube 18' so that all the light is directed to the TV camera 48. The x-ray image is then simultaneously recorded by the photographic film in changer 32 and digitally through the TV camera 48. The exposure controller 28 is controlled by the film changer controller 46. The exposure rate timing is not synchronized to VDr 38. Generally, selectable exposure rates are the exposures for the film changer 32, i.e., single frame, 1/s, 2/s, 3/s, and 4/s.

In the analog fluoro mode, the film changer 32 is moved out of the x-ray beam and the split mirror 18 is placed to the side of the optical cube 18' so that the TV camera views the optical image unattenuated. The optical image is converted by the TV camera 48 into an analog video signal that is conveyed to the image monitor 50 for display. There is no digital acquisition. The x-ray generator 12 controls its own exposure with exposure rate timing synchronized to the VDr reference timing signal, hence, the video camera 48. Generally, selectable x-ray exposure rates are continuous, i.e., 7.5, 15, and 30 fps.

In the digital fluoro mode, the film changer 32 is moved out of the x-ray beam and the split mirror 18 is placed to the side of the optical cube 18' so that all the light is directed to the TV camera 48. The optical image is acquired through the TV camera and converted to a digital video signal which is processed and displayed on the image monitor display 50 and/or stored in the image storage device 52. In this mode, the x-ray generator 12 synchronizes its own exposure rate timing to VDr 38. Generally, selectable exposure rates are continuous, 7.5, 15, and 30 fps.

TABLE 1 provides a summary of the characteristics of the above-discussed acquisition modes.

TABLE 1

|  | Exposure Rate | Exposure Timing Sync to VDr | Digital Acquisition | Exposure Controlled By |
|---|---|---|---|---|
| (i) cine film | 30, 60, 90, 120 fps | yes | no | cine film camera controller |
| (ii) spot film | S, 1, 2, 3, 4, 6/s | no | no | spot film camera |

TABLE 1-continued

| | Exposure Rate | Exposure Timing Sync to VDr | Digital Acquisition | Exposure Controlled By |
|---|---|---|---|---|
| (iii) film changer | S, 1, 2, 3, 4/s | no | no | film changer controller |
| (iv) digital cine | 15, 30, 60 fps | yes | yes | digital imaging system |
| (v) digital spot | S, 1, 2, 3, 4, 7.5/s | yes | yes | digital imaging system |
| (vi) cine verification | 30, 60, 90, 120 fps | yes | yes | cine film camera controller |
| (vii) spot verification | S, 1, 2, 3, 4, 6/s | no | yes | spot film camera controller |
| (viii) changer verification | S, 1, 2, 3, 4/s | no | yes | film changer controller |
| (ix) analog fluoro | continuous 7.5, 15, 30 fps | yes | no | x-ray generator |
| (x) digital fluoro | continuous 7.5, 15, 30 fps | yes | yes | x-ray generator |

As set forth above, the present multi-mode x-ray imaging system provides for ten acquisition modes. Of these, six use digital image acquisition. The six digital acquisition modes can be classified into synchronous and asynchronous groupings according to their x-ray exposure timings in relation to the VDr signal 38.

Previous, digital imaging systems are able to acquire images only in those acquisition modes with x-ray exposure timing synchronous to a system reference signal such as VDr 38. In asynchronous acquisition modes, the video signal from a camera or camera controller is fed directly to a display, bypassing any digital acquisition and processing. Therefore, the displayed image flickers in a degree according to the exposure rate and the image will not remain displayed on the display device once image acquisition ceases.

In order for the present invention to be able to display all digitally acquired valid images in a flicker-free manner, digital processing of image data obtained in asynchronous exposure modes is accomplished.

In the asynchronous mode and at low synchronous acquisition rates, the digital imaging system 40 generates a beam blanking signal 54 which is sent to a TV camera controller 56. The digital imaging system 40 supplies timing signals to synchronize the TV camera 48 to the VDr signal 38. The beam blanking signal 54 puts the TV camera 48 and TV camera controller 56 into a target storage mode so that the x-ray images being integrated by the camera tube are saved for later readout. Using the beam blanking signal 54 to synchronize the readout timing of the video images to the VDr signal 38 allows the digital imaging system to acquire x-ray images in asynchronous exposure modes such as spot verification or changer verification and those modes having low relative acquisition speeds such as digital fluoro, digital spot and digital cine (See pulse, asynchronous pulse, TABLE 2).

During operation of the camera 48, when beam blanking 54 is not asserted, after each pixel is read from camera 48 the pixel contents are erased. When beam blanking 54 is asserted, the pixel contents are continuously integrated and stored. Thereafter, when beam blanking is again non-asserted, each pixel is read and then erased, thereby readying the pixels to integrate during the next exposure duration.

Figure 2:
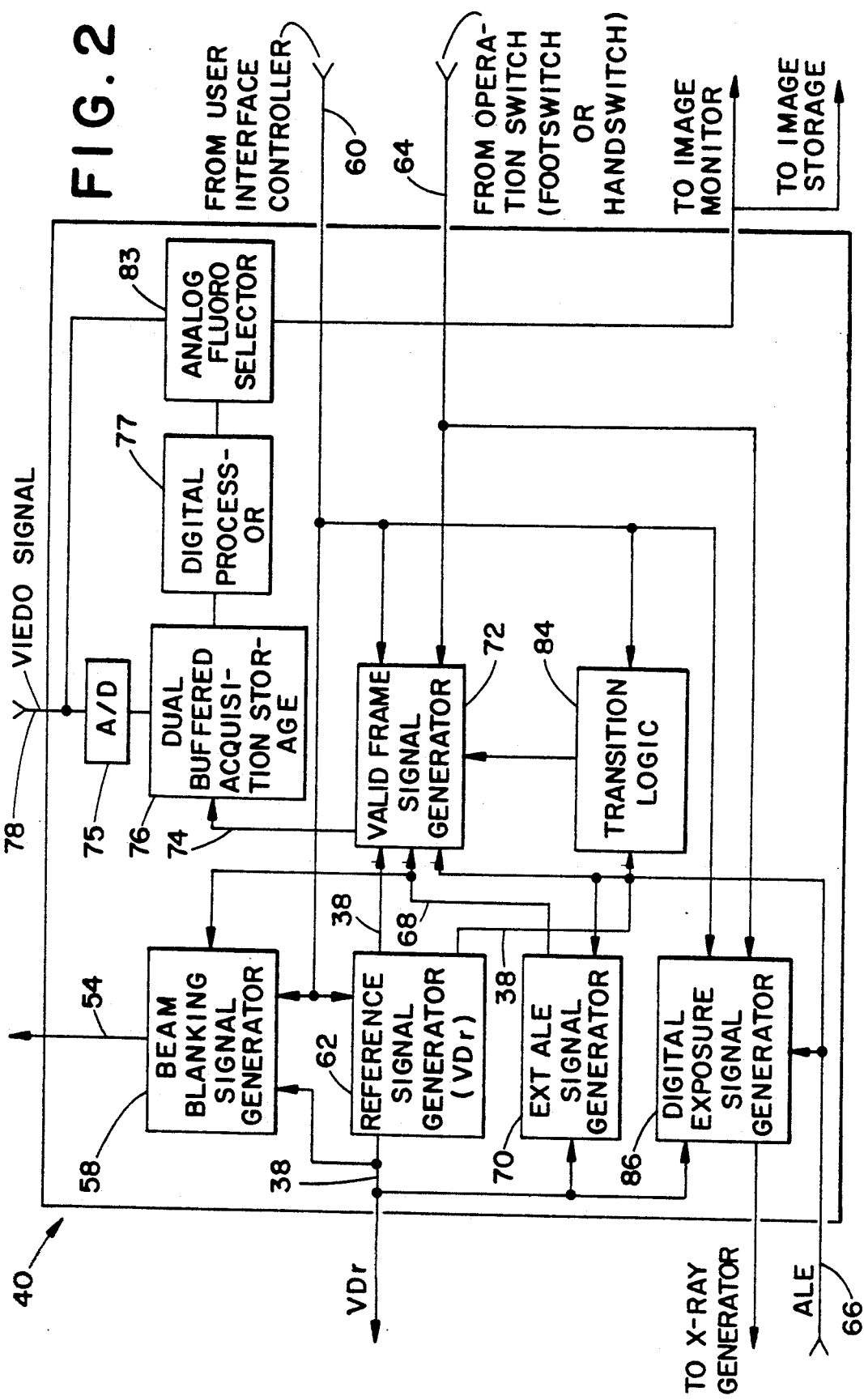
FIG. 2 is a more detailed block diagram of the digital imaging system of FIGS. 1A and 1B.

With reference to FIG. 2, the digital imaging system 40 generates the beam blanking signal 54 with a beam blanking signal generator 58. The beam blanking signal generator continuously samples and monitors the acquisition mode and exposure rate signal 60. The reference signal (VDr) 38 is generated by a reference signal generator 62.

Several signals are continuously monitored by the digital imaging system 40 to determine the existence of valid video images. The signals include an EXP FS (exposure foot switch/hand switch) signal 64; an ALE (actual length of exposure) signal 66; a VDr (video driven reference) signal 38; an ACQ MODE SEL & EXP RATE (a group of signals indicating which acquisition mode and exposure rate is selected) 60; an EXT_ALE (extended ALE) signal 68; and a beam blanking (output signal) signal 54. The ALE signal from the x-ray generator indicates the start of the x-ray exposure and its duration represents the actual length of time the x-ray is being generated, i.e., the length of each x-ray pulse.

Generally, all digital acquisition exposures can be represented by four different exposure timings as shown in FIGS. 4A–4D and summarized in TABLE 2, regardless of acquisition mode or exposure rate.

TABLE 2

| Timing | Exposure Mode | VDr (Hz) | Acquisition Mode and Exposure Rate | |
|---|---|---|---|---|
| FIG. 4A | Continuous | 30 | digital fluoro continuous | (x, TABLE 1) |
| FIG. 4B | Continuous | 30 | digital fluoro 30 fps | (x, TABLE 1) |
| | | 30 | digital cine 30 fps | (iv, TABLE 1) |
| | Pulse | 60 | digital cine 60 fps | (iv, TABLE 1) |
| | | 30 | cine verification 30 fps | (vi, TABLE 1) |
| | | 60 | cine verification 60, 90, 120 fps | (vi, TABLE 1) |
| FIG. 4C | Pulse | 30 | digital fluoro 7.5, 15 fps | (x, TABLE 1) |
| | | 15 | digital spot S, 1, 2, 3, 4, 7.5 fps | (v, TABLE 1) |
| | | 30 | digital cine 15 fps | (iv, TABLE 1) |
| FIG. 4D | Asynchronous Pulse | 15 | spot verification S, 1, 2, 3, 4, 6 fps | (vii, TABLE 1) |
| | | 15 | changer verification S, 1, 2, 3, 4 fps | (viii, TABLE 1) |

By continuously sampling and monitoring the acquisition mode and exposure rate signal at VDr 38, the digital imaging system 40 determines the current exposure mode (see TABLE 2). TABLE 3 shows the logic associated with the beam blanking signal 54 based on the current exposure mode. It may be noted that the EXT_ALE signal 68, generated by the EXT_ALE signal generator 70, is an internal signal derived by stretching the ALE signal 66 to VDr 38.

TABLE 3

| Exposure Mode | Beam Blanking |
|---|---|
| Continuous | Not asserted |
| Continuous Pulse | Not asserted |
| Pulse | EXT_ALE |
| Asynchronous Pulse | EXT_ALE |

With continuing reference to FIG. 2, the signals EXP FS 64, ALE 66, EXT$_{13}$ ALE 68, VDr 38, and ACQ MODE SEL & EXP RATE 60 are monitored in the digital imaging system 40 by a valid frame signal generator 72. When a valid image is determined through the above monitoring, a valid frame signal 74 is issued. This signal is issued to a dual buffered acquisition storage 76. A more detailed explanation regarding the generation of a valid image is discussed below.

With reference again to FIG. 3, one frame of a video signal 78 from TV camera controller 56 is digitized and conveyed to the first image buffer 80a for storage. In one arrangement, the digitizing takes place by use of an A/D converter 75 in the digital imaging system 40. A previously acquired image in the second buffer 80b is digitally processed by digital processor 77 and is stored or displayed. The digital imaging system 40 continuously examines the timing signals to determine if each acquired frame is valid.

Software monitors for the valid frame signal 74 at each occurrence of each VDr pulse 38 and upon detection of the valid frame signal 74, a switch 82 switches the roles of the two image buffers 80a, 80b. The back and forth switching roles of the two image buffers continues at the VDr pulse 38 when a valid frame signal 74 is concurrently detected. This technique assures that the software of the system only deals with properly exposed images, regardless of acquisition modes and exposure rates. It also simplifies and reduces the real time requirements of the software, and allows the last image to remain displayed when projection of x-rays across the examination region and further image acquisition ceases. More specifically, when the x-ray exposure stops, the valid frame signal will be false and there will be no switching roles of the two image buffers 80a, 80b. The last valid image remains as the displayed image. During pulsed exposures in between valid image signals 74, the last valid image is continuously displayed to fill in the time on the image monitor 50 between exposure pulses, thereby assuring flicker-free display.

The generation of a valid frame signal 74 is based on the proposition that in any acquisition mode and exposure rate, the mA and kV from the x-ray generator 12 and the TV camera 48 have been calibrated and/or set in such a way that the video signal level generated by the TV camera 48 is optimal and consistent, regardless of the patient size and area of anatomy. However, in continuous mode or continuous pulse exposure mode, there is no time (i.e. one complete VDr period is needed) in between exposures to allow the readout of images, in this case, beam blanking signal 54 is not asserted (see TABLE 3) and images are readout continuously (see FIGS. 4A, 4B). Therefore, images may be underexposed at the beginning of the exposure. In any exposure mode, an image at the end of an exposure may be inadequately exposed due to the premature termination by the operation switch 24.

At the beginning of an exposure, in continuous and continuous pulse exposure modes (see FIGS. 4A, 4B), video images are continuously readout from the camera tube target ("beam blanking" is not asserted). However, it has been observed that video images #1 and #2 in continuous exposure mode, FIG. 4A, and video image #1 in continuous pulse exposure mode, FIG. 4B, are underexposed. To prevent the underexposed images from being displayed, the digital imaging system 40 discards these images by not asserting the valid frame signal 74 until the digital imaging hardware has counted two VDr's since ALE 66 is first asserted. Thereafter, valid frame 74 is asserted immediately in continuous pulse exposure mode, and is asserted at the next VDr in continuous exposure mode (image #3 in FIG. 4A and image #2 in FIG. 4B).

When in the continuous and continuous pulse exposure modes after each pixel has been read from the camera 48, the contents of that pixel are erased. In contrast, when the beam blanking signal 54 is asserted, the TV camera 48 and TV camera controller 56 are placed in a storage mode. While in the storage mode, x-ray images integrated by the camera tube and stored as contents of the pixels, are not read or erased. Rather, the pixels continue to store the x-ray images integrated by the camera tube. Thereafter, when the beam blanking signal 54 is not asserted, the contents of the pixels are read out and erased, thereby readying the pixels to integrate during the next exposure duration.

In pulse exposure and asynchronous pulse exposure modes (see FIGS. 4C, 4D), the assertion of beam blanking 54 causes the first video image to be fully exposed and integrated; therefore, it is a valid frame. However, the assertion of beam blanking 54 delays the readout of the image by one VDr 38 and the completion of the readout takes another VDr 38, therefore valid frame 74 is not asserted until two VDr after the valid image is acquired in the camera.

As shown in FIG. 4D, in asynchronous exposure mode ALE 66 timing is not synchronized to VDr 38. In this mode, beam blanking 54 is used to integrate and save the video image so that the image frame readout time is synchronized to VDr 38. In this way, the digital imaging system 40 acquires images even in asynchronous exposure modes, provided that there is at least one complete VDr 38 in between exposures for the image frame readout. Generally, the generator is set up such that in asynchronous exposure mode, there is at least one VDr for the video image readout. VDr frequency can also be increased to shorten the image frame readout time.

In the present x-ray system, the x-ray exposure rate may be changed "on-the-fly" for any of the six digital acquisition modes, as desired by a user. During the transition period occurring during the exposure rate change, images may be under or overexposed. Prior imaging systems do not differentiate between valid and under or overexposed images. All images are displayed, thereby resulting in momentary flicker on the display. The present invention provides a manner of differentiating between valid images and under or overexposed images during the transition period.

As shown in FIG. 2, the present invention provides transition logic 84 to determine if the last image, prior to the exposure rate transition, is acquired before the first exposure of the new exposure rate. For example, if the vertical drive VDr 38 signal is a 30Hz signal, and the current exposure rate is 15 frames per second, the exposure takes place during one VDr 38 cycle and the image is read on the next cycle where no exposure takes place. If the exposure rate is changed during the cycle when an image is being exposed, the new exposure rate will start on the next VDr cycle. Since the new exposure starts when the TV camera 48 is reading the previous image, the new exposure is improperly exposed. The transition logic 84 detects this improper exposure and indicates to the software that the image is invalid.

In certain digital acquisition modes (see TABLE 2), if a user changes exposure rates on-the-fly the change of exposure rate also may change the exposure mode, as shown in FIGS. 5A, 5B. As previously noted, during the exposure rate change transition, some of the video images may be over or underexposed. In FIG. 5A, the exposure rate changes between images #3 and #4, in this case, all x-ray images are valid during the transition. In FIG. 5B, the exposure rate changes during image #2. In this case, images #2 and #3 would be invalid and the transition logic 84 discards these two images by not allowing assertion of the valid frame signal 74.

Figure 6A:
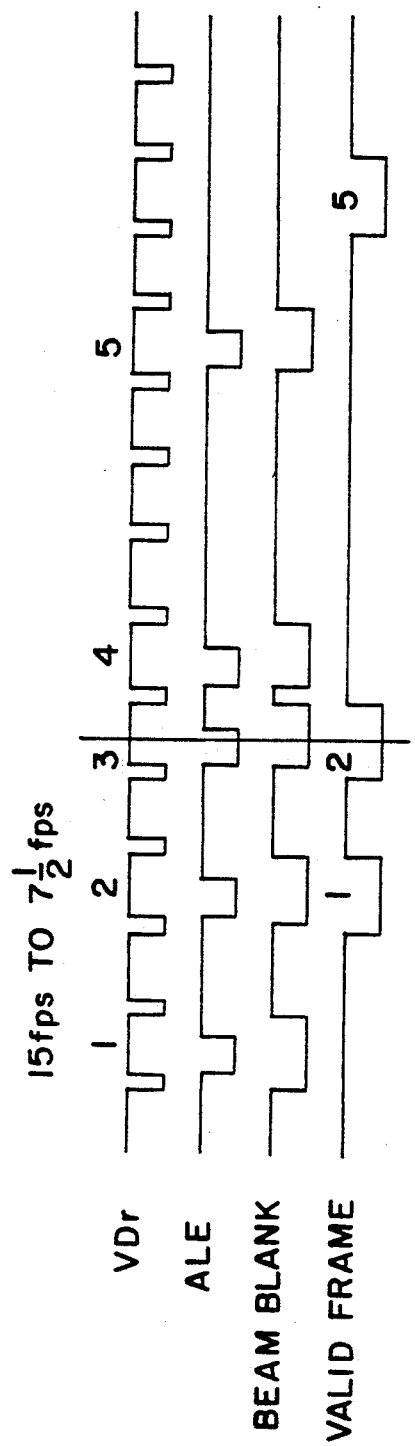
Figure 6B:
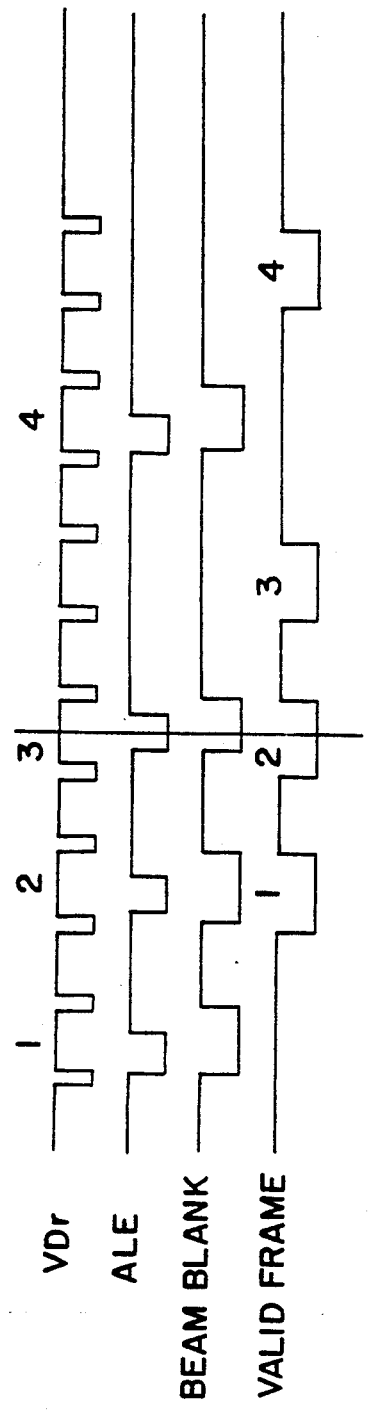

The transition logic continuously monitors the exposure rate change at VDr 38. Once an exposure rate change is detected, the generation of valid frame 74 will be as if the exposure has just started a new operation. An exception to this exists for pulse or asynchronous pulse mode. As shown in FIG. 6, if there is not a full VDr 38 period between the last image exposure and the first exposure under the new rate, the first video image under the new rate will be overexposed, and it will be discarded by non-assertion of a valid frame signal.

Figure 8A:
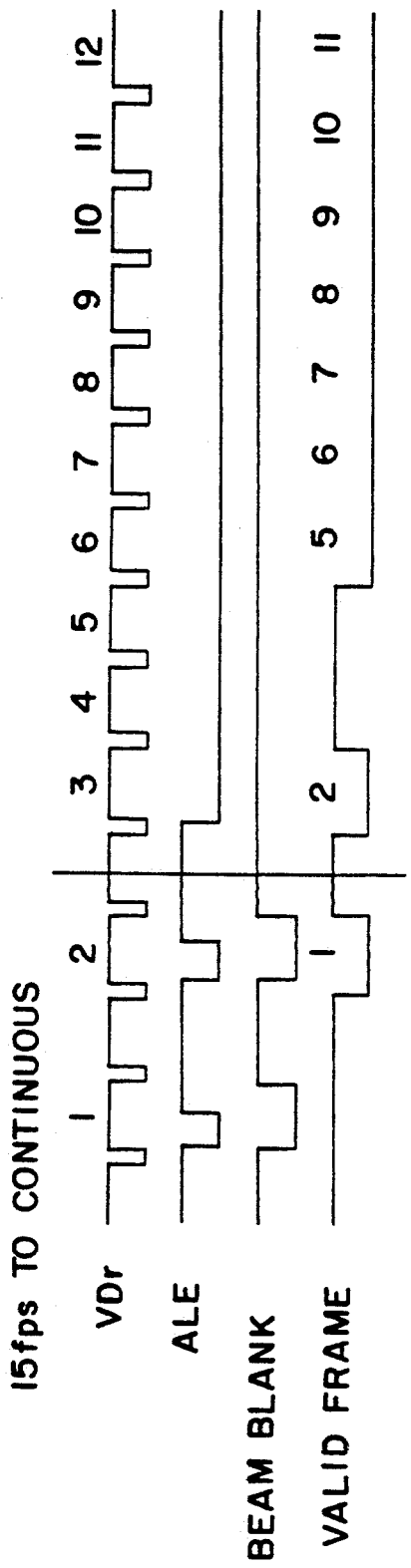
Figure 8B:
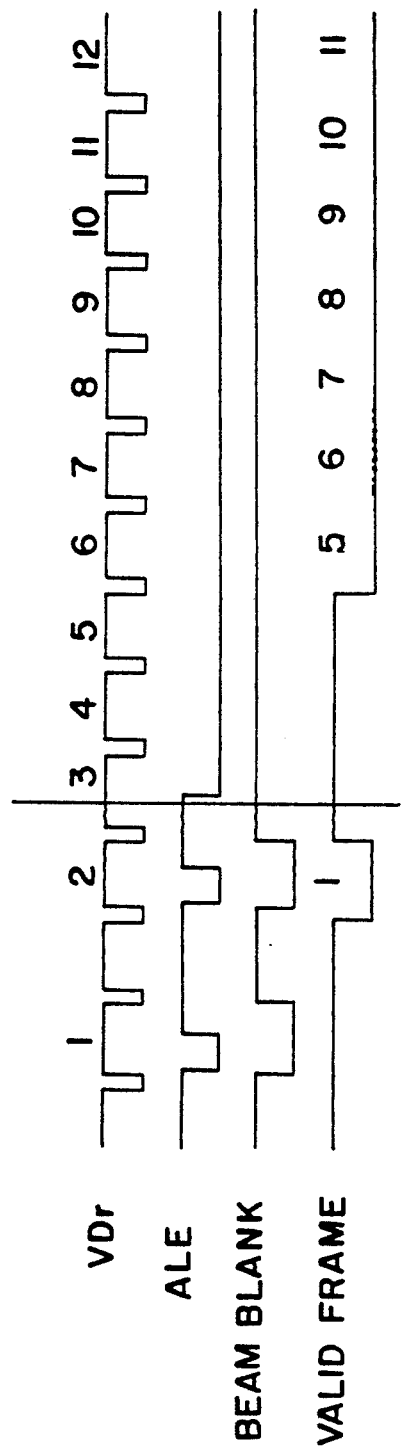
Figure 9A:
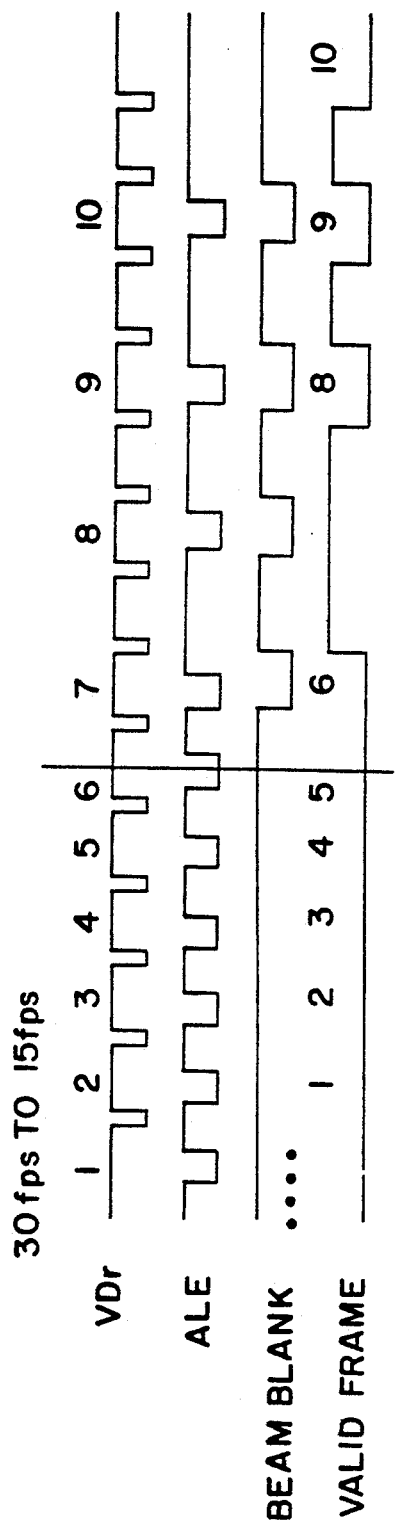
Figure 9B:
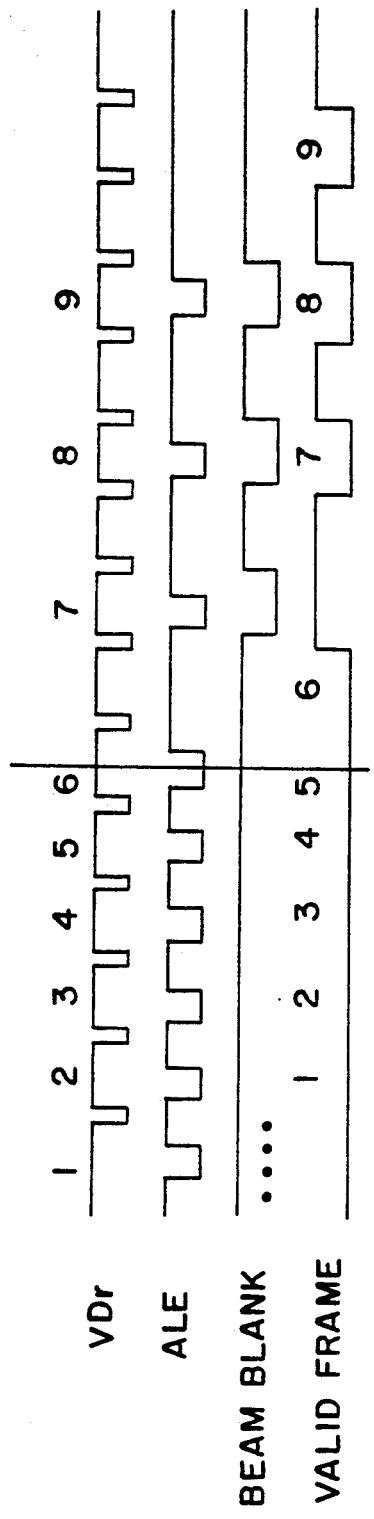
Figure 10A:
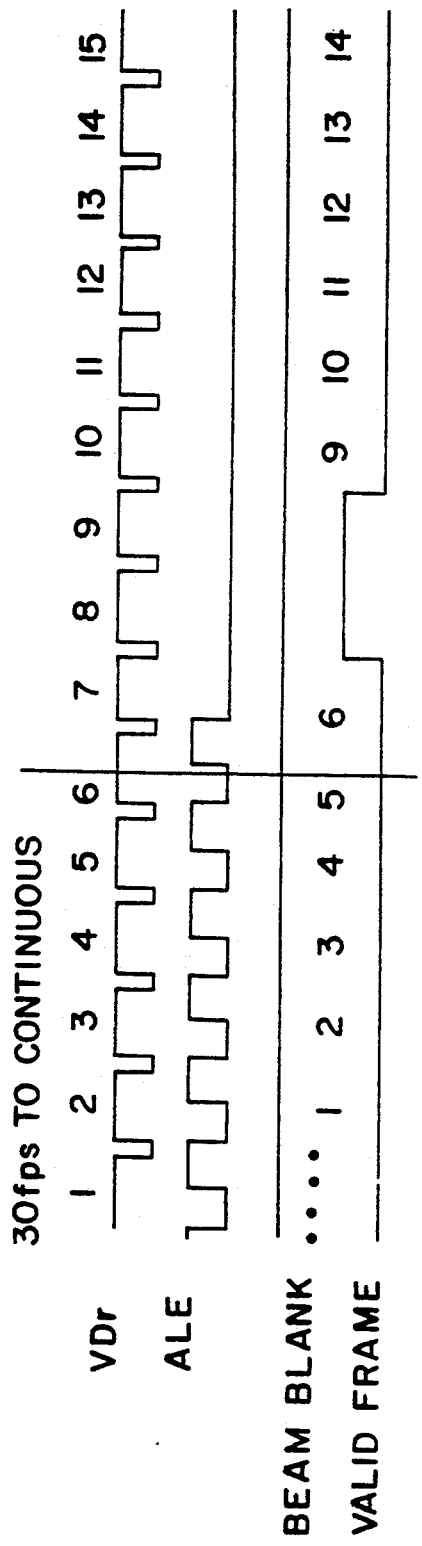
Figure 10B:
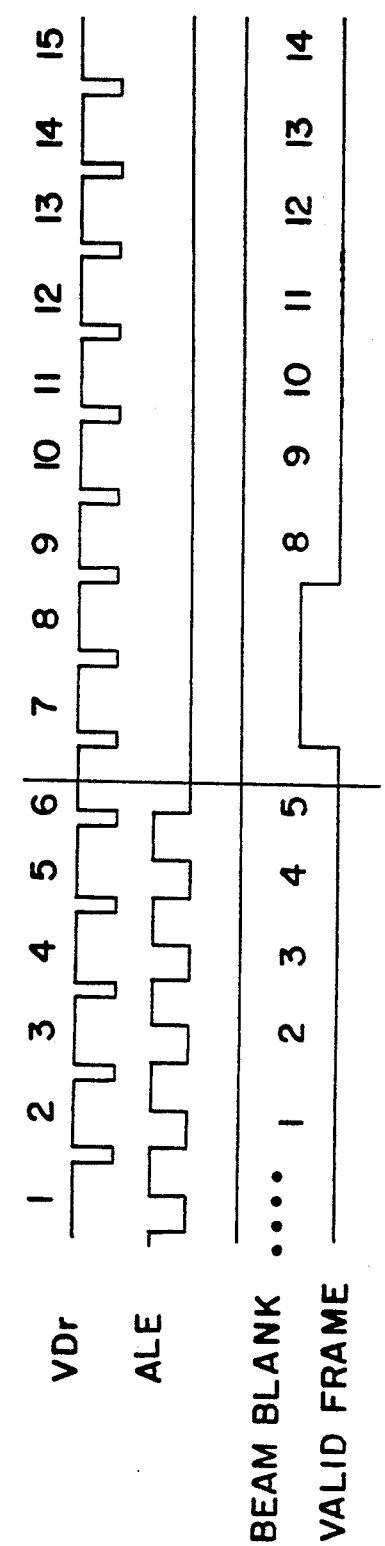
Figure 11A:
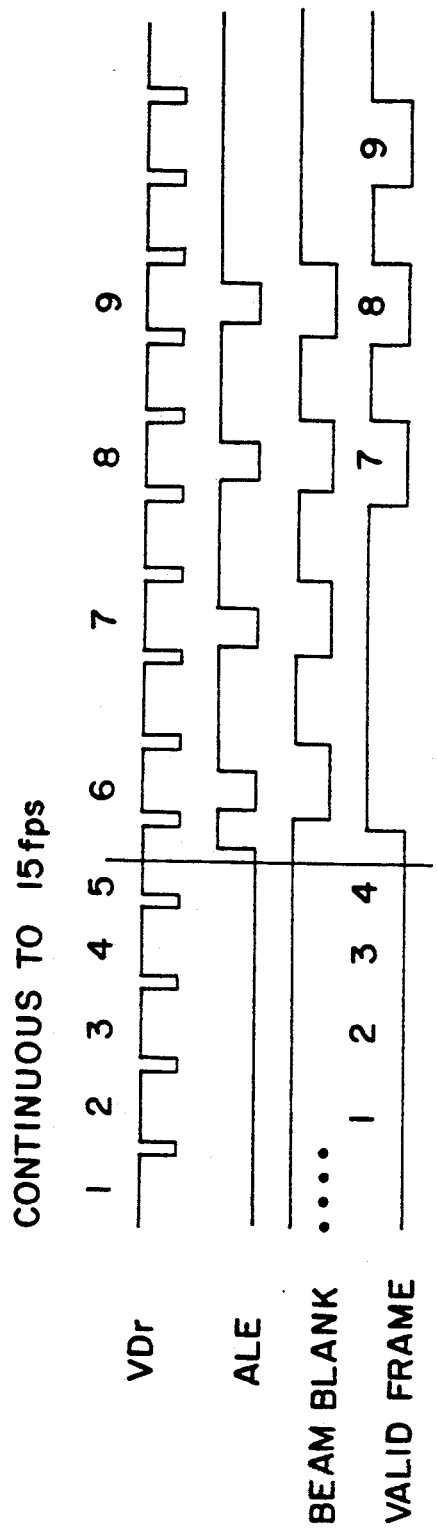
Figure 11B:
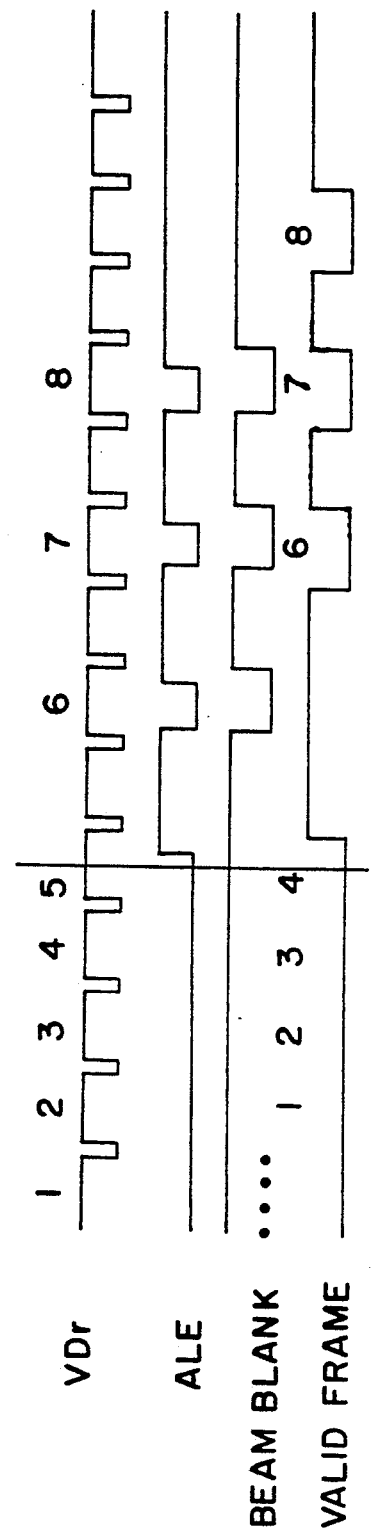
Figure 12A:
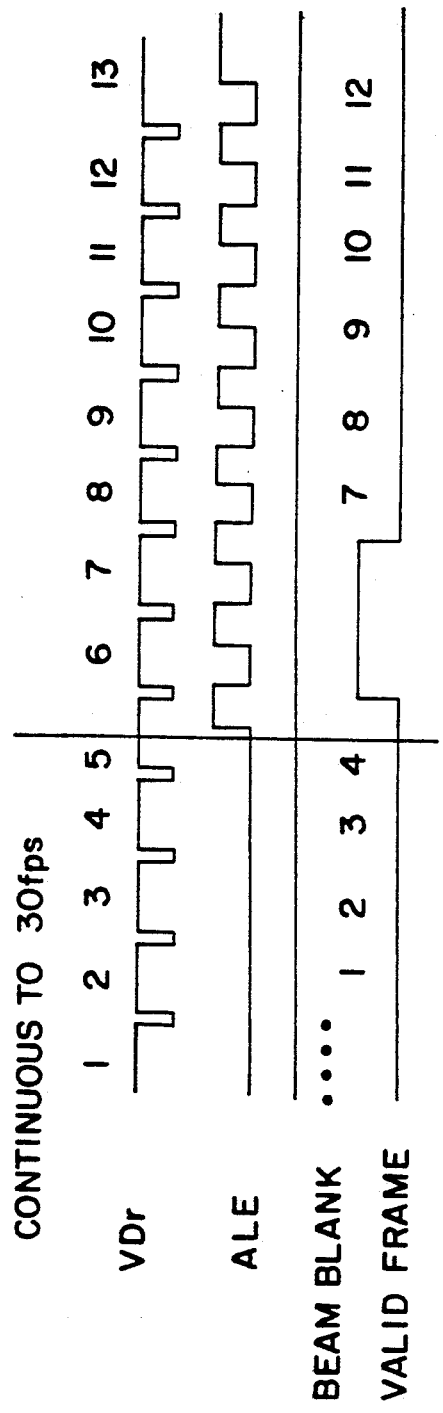
Figure 12B:
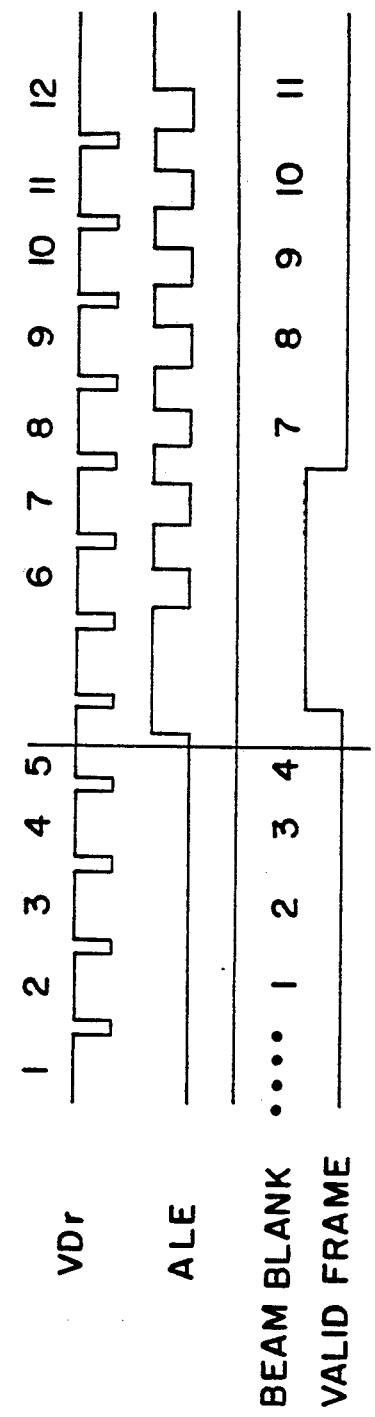

If a continuous exposure mode is operating before the new exposure rate, the last image would not be fully exposed and a valid frame 74 would not be asserted (see FIGS. 11A, 11B, 12A, 12B). If a continuous pulse exposure mode is operating before the new exposure rate, the last image would be fully exposed and a valid frame 74 would be generated (see FIGS. 9A, 9B, 10A, 10B). When a pulse or asynchronous pulse mode is functioning before the new exposure rate, and if the last image is read out after a beam blanking signal 54, before exposure under the new rate, the last image is valid and a valid frame 74 is asserted (see FIGS. 6B, 7A, 8A). Also, if the readout of the last image overlaps the exposure under the new rate, or if the last image is integrated with the first image of the new rate, the last image is discarded and valid frame 74 is not asserted (see FIGS. 6A, 7B, 8B).

Timing diagram FIGS. 6A-12B are set forth in pairs (i.e., 6A-6B, 7A-7B, 8A-8B, etc.). Each of these pairs are directed to differing exposure rate changes. For example, FIGS. 6A and 6B disclose timings for an exposure rate change from 15 fps to 7.5 fps during the frame #3 of the VDr signal. These exposure rate changes can occur at slightly different times during the same cycle. These differences affect the operation of the system resulting in somewhat different timing cycles. Such differences can be seen, for example, in the portions of the timing diagrams located after the exposure rate change as indicated in the Figures.

An alternative embodiment in which only valid images will be displayed on the image monitor display 50 during the transition period is to arrange the imaging system to control the generator. Thereby, the hardware and/or software can temporarily suspend the exposure rate change until the transition can be made without causing improperly exposed images.

At the end of any digital acquisition mode exposure, the last x-ray video image from the TV camera controller 56 may be fully exposed and is valid for digital processing and display. Previous digital imaging systems discard the current image frame when the exposure operation switch such as the foot switch 24 is off. This causes the loss of potentially useful images as the last x-ray video image is discarded even if it contains a useful image. The present invention provides a manner of determining whether the last acquired image is valid thereby allowing display of the last image if it is found to be valid.

The digital imaging system 40 checks the time during the VDr 38 cycle that the operation switch 24 is released. If the x-ray exposure for that cycle has been completed before the operation switch is released, then a valid frame signal 74 indicates the exposure was a good image. However, if the operation switch 24 is released while the exposure is taking place, then the image will be marked as invalid.

FIGS. 4B-4D show a solid FS 64 which indicates ALE 66 has been cut short by the operation switch 24 (i.e. foot switch or hand switch). The dotted FS 64 in these FIGURES indicates ALE 66 is turned off by the automatic exposure control, and therefore, the last image is fully exposed. The dotted valid frame indicates the last frame is valid if ALE 66 is turned off before FS 64. In continuous exposure mode (see FIG. 4A), the ALE 66 is always turned off by the FS.

The digital exposure signal generator 86 generates an exposure signal which is sent to the x-ray generator 12, which in turn energizes the x-ray tube 10.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of acquiring images in a multi-mode x-ray system:
    projecting x-rays across an examination region;
    integrating image data developed from the projected x-rays into a camera means;
    generating a reference signal from a digital imaging means;
    monitoring with the digital imaging means acquisition modes and x-ray exposure rates selected by an operator and input through a user interface means;
    determining from the monitoring step when a selected acquisition mode has at least one of a pulse exposure rate, an asynchronous pulse exposure rate, a continuous pulse exposure rate, and a continuous exposure rate;
    generating in the digital imaging means a beam blanking signal synchronous to the reference signal for the camera means when the determining step determines the selected acquisition mode is at least one of the pulse exposure rate and the asynchronous pulse exposure rate, the beam blanking signal causing the image data developed from the projected x-rays to be stored in the camera means;
    reading out the stored image data when generation of the beam blanking signal is ended;
    digitizing the read out image data;
    writing the digitized image data into a first buffer of a dual buffered storage;
    checking at generation of the reference signal whether the image data in the first buffer is a valid image;
    switching an output of the dual buffered storage to connect the first buffer to an image monitor means to display the image data in the first buffer on the image monitor means when the image data is found to be valid in the checking step; and,
    writing next digitized image data into a second buffer of the dual buffered storage when an output of the dual buffered storage has been switched to display the valid image in the first buffer.

2. The method according to claim 1 wherein the beam blanking signal is asserted during the pulse exposure mode when the pulse exposure is not continuous.

3. The method according to claim 1 wherein the asynchronous pulse exposure mode is asynchronous to the reference signal during image acquisition.

4. The method according to claim wherein switching between the first buffer and the second buffer is actuated when the buffer not currently displaying its image data is determined to contain a valid image, such switching providing a flicker-free display of the valid images.

5. The method according to claim 4 further including the step of:
maintaining displayed on the image monitor means the last valid image displayed, after image acquisition ceases.

6. The method according to claim further including the step of:
transferring valid image data located in the dual buffered storage to an image storage means.

7. The method according to claim further including the steps of:
activating an operation switching means controlled by an operator to begin the projecting of x-rays across the examination region;
deactivating the operation switching means to end the projecting of x-rays across the examination region;
monitoring a time within a cycle of the reference signal that the operation switching means is deactivated;
determining whether x-ray exposure for the cycle is completed prior to deactivation of the operation switching means; and,
generating a valid frame signal by the valid frame generator when the x-ray exposure is completed prior to the deactivating step.

8. The method according to claim 1 further including the steps of:
selecting through the user interface means a new x-ray exposure rate different from an x-ray exposure rate selected at a start of image acquisition;
determining through transition logic whether last image data being acquired prior to selecting of the new x-ray exposure rate is completed before a new x-ray exposure at the new x-ray exposure rate; and,
transmitting an indication signal from the transition logic to a valid frame signal generator that the last image data is invalid when the determining step determines the last image data is being acquired while the new x-ray exposure is started and, transmitting an indication signal to the valid frame signal generator that the last image data is valid when the determining step determines the last image data has been acquired prior to the new x-ray exposure rate.

9. The method according to claim 8 wherein the transition logic continuously monitors the reference signal to determine changes in the x-ray exposure rate.

10. The method according to claim 1 further including the steps of:
acquiring image data in an analog mode; and,
connecting an output of the camera means to the image monitor to display the image data acquired in the analog mode.

11. The method according to claim 1 wherein the multi-modes which acquire images in the x-ray system include cine film, spot film, film changer, digital cine, digital spot, cine verification, spot verification, changer verification, analog fluoro, and digital fluoro.

12. The method according to claim 1 wherein the determining step determines the acquisition mode has one of a pulse exposure rate and asynchronous pulse exposure rate as a new x-ray exposure rate.

13. The method according to claim 12 further including the steps of:
determining that less than a full reference signal period between a last image exposure and a first image exposure under the new x-ray exposure rate exists; and,
transmitting an indication signal from transition logic to a valid frame signal generator that an initial video image under the new x-ray exposure rate is overexposed.

14. A method of validating a last image acquired during operation of an x-ray system:
projecting x-rays across an examination region;
ending the projection of the x-rays across the examination region;
monitoring a time within a cycle of a reference signal that the projection of x-rays ends;
determining whether x-ray exposure was completed prior to the monitored time in the reference signal cycle; and,
generating a valid frame signal when the x-ray exposure was completed prior to the monitored time in the reference signal cycle.

15. A method of displaying only valid images on a display when an x-ray exposure rate is changed from an initial x-ray exposure rate during operation of a multi-mode x-ray system:
selecting a new x-ray exposure rate different from the initial x-ray exposure rate;
determining whether last image data being acquired prior to selecting of the new x-ray exposure rate is completed before a new x-ray exposure at the new x-ray exposure rate; and,
transmitting an indication signal to a valid frame signal generator that the last image data is (i) invalid when the determining step determines the last image data was still being acquired when the new exposure started and (ii) valid when the determining step determines the last image data was acquired prior to starting of the new exposure.

16. An apparatus for acquiring images display in a multi-mode x-ray system:
projecting means for projecting x-rays across an examination region;
integrating means for integrating image data developed from the projected x-rays into a camera means;
generating means for generating a reference signal from a digital imaging means;
monitoring means for monitoring, by the digital imaging means, acquisition modes and x-ray exposure rates selected by an operator and inputted through a user interface;
determining means for determining from the monitoring step when an acquisition mode which is operating has at least one of a pulse exposure rate, an asynchronous pulse exposure rate, a continuous pulse exposure rate, and a continuous exposure rate;
generating means for generating a beam blanking signal synchronous to the reference signal for transmission to the camera means when the determining means determines the selected acquisition mode is at least one of the pulse exposure rate and the asynchronous pulse exposure rate, the beam blanking signal causing the image data developed from the projected x-rays to be stored in the camera means;

reading out means for reading out the stored image data when generation of the beam blanking signal is ended;

digitizing means for digitizing the read out image data;

writing means for writing the digitized image data into a buffer storage;

checking means for checking at a generation of the reference signal whether the image data in the buffer storage is a valid image;

outputting means for outputting the valid image to an image monitor means when the image data is valid; and, writing means for writing next digitized image data into the buffer storage when the output means is outputting the valid image to the image monitor means.

17. The apparatus according to claim 16 wherein the buffer storage is a dual buffered storage having a first buffer and a second buffer.

18. The apparatus according to claim 17 further including a buffer switching means wherein the buffer switching means connects one of the first buffer and second buffer of the dual buffered storage with at least one of an image storage means and the image monitor while a valid image is in the connected buffer and switches to the other buffer upon detection of a valid image stored therein.

19. The apparatus according to claim 18 wherein the buffer switching means remains connected to one of the first buffer and the second buffer which has the last valid image, after image acquisition ceases, whereby the last valid image remains displayed on the image monitor.

20. The apparatus according to claim 16 further including:

operation switching means controlled by an operator, for activating and deactivating projection of x-rays across the examination region;

monitoring means for monitoring the time, within a cycle of the reference signal that the operation switching means deactivates projection of the x-rays;

determining means for determining whether x-ray exposure for the cycle is completed prior to deactivation; and, a valid frame signal generator for generating a valid frame signal when the x-ray exposure is completed prior to deactivation.

21. The apparatus according to claim 16 further including:

a user interface controller for selecting a new x-ray exposure rate different from an initial x-ray exposure rate;

transition logic for determining whether last image data being acquired prior to selection of the new x-o ray exposure rate is completed before a new x-ray exposure; and, transmitting means for transmitting from the transition logic to the valid frame signal generator whether the last image is usable.

22. An x-ray diagnostic imaging apparatus comprising:

an x-ray generator means for controlling an x-ray tube to emit pulses of x-rays directed toward an examination region;

an image intensifier means for converting x-rays which have passed through the examination region into an optical image, which optical image pulsates in intensity between (i) a strong intensity and (ii) a weak or no intensity with the x-ray pulses;

a video camera means for converting the pulsating optical image into a series of electronic image frames, some of the frames being converted from the optical image substantially completely at the strong intensity and some of the frames being converted from the optical image at least in part at the weak or no intensity;

a validation means for identifying which frames are converted from the optical image substantially completely at the strong intensity;

a memory means controlled by the validation means to store each frame converted substantially completely at the strong intensity and conveying the stored frame to a video monitor for display until a next subsequent frame converted substantially completely at the strong intensity is identified by the validation means and stored by the memory means.

23. The apparatus according to claim 22 wherein the memory means includes:

at least first and second buffers each of which stores an electronic frame;

a switching means which switches between at least first and second states, in the first state, the switch means channels frames to the first buffer while the frame stored in the second buffer is repeatedly read out to the video monitor and, in the second state, the switch means channels subsequent frames to the second buffer while the frame stored in the first buffer is repeatedly read out to the video monitor, the switching means switching between the states in response to the validation means identifying that a complete frame converted substantially at the strong intensity has been stored in the buffer to which the frames are being channelled.

* * * * *